United States Patent [19]
Antoniades et al.

[11] Patent Number: 6,115,154
[45] Date of Patent: Sep. 5, 2000

[54] METHOD AND SYSTEM FOR DETECTING LOSS OF SIGNAL IN WAVELENGTH DIVISION MULTIPLEXED SYSTEMS

[75] Inventors: Neophytos Antoniades, Long Island City, N.Y.; Janet Lehr Jackel, Holmdel, N.J.; Dwight Hugh Richards, Ocean, N.J.; Wei Xin, Eatontown, N.J.

[73] Assignee: Telcordia Technologies, Inc., Morristown, N.J.

[21] Appl. No.: 09/156,715

[22] Filed: Sep. 18, 1998

[51] Int. Cl.[7] .................................................. H04B 10/08
[52] U.S. Cl. ......................... 359/110; 359/134; 356/73.1
[58] Field of Search ........................... 356/73.1; 359/110, 359/134, 160, 173

[56] References Cited

U.S. PATENT DOCUMENTS

| | | | |
|---|---|---|---|
| 4,726,676 | 2/1988 | Maslaney et al. | 356/73.1 |
| 4,883,054 | 11/1989 | Fuller et al. | 606/12 |
| 5,335,104 | 8/1994 | Johnson | 359/110 |
| 5,793,481 | 8/1998 | Leali | 356/73.1 |
| 5,963,312 | 10/1999 | Roberts | 356/73.1 |
| 6,008,915 | 12/1999 | Zyskind | 359/110 |
| 6,011,623 | 1/2000 | MacDonald et al. | 356/73.1 |

*Primary Examiner*—Kinfe-Michael Negash
*Attorney, Agent, or Firm*—Orville R. Cockings; Joseph Giordano

[57] ABSTRACT

A method and system for unambiguously detecting fiber cuts in an optical network regardless of the number of EDFAs that are located between the fiber cut and the monitor point. In accordance with our invention, the power of a marker wavelength is compared to the power of a nearby spectral region. Where the comparison indicates that the power ratio is approximately equal to unity a flag is raised indicating that there is fiber cut. Where the comparison indicates that the power ratio is much greater than unity the flag is not raised. The monitoring point includes circuitry for detecting the ratio between the marker wavelength and the nearby spectral band and for indicating when there is a fiber cut.

20 Claims, 5 Drawing Sheets

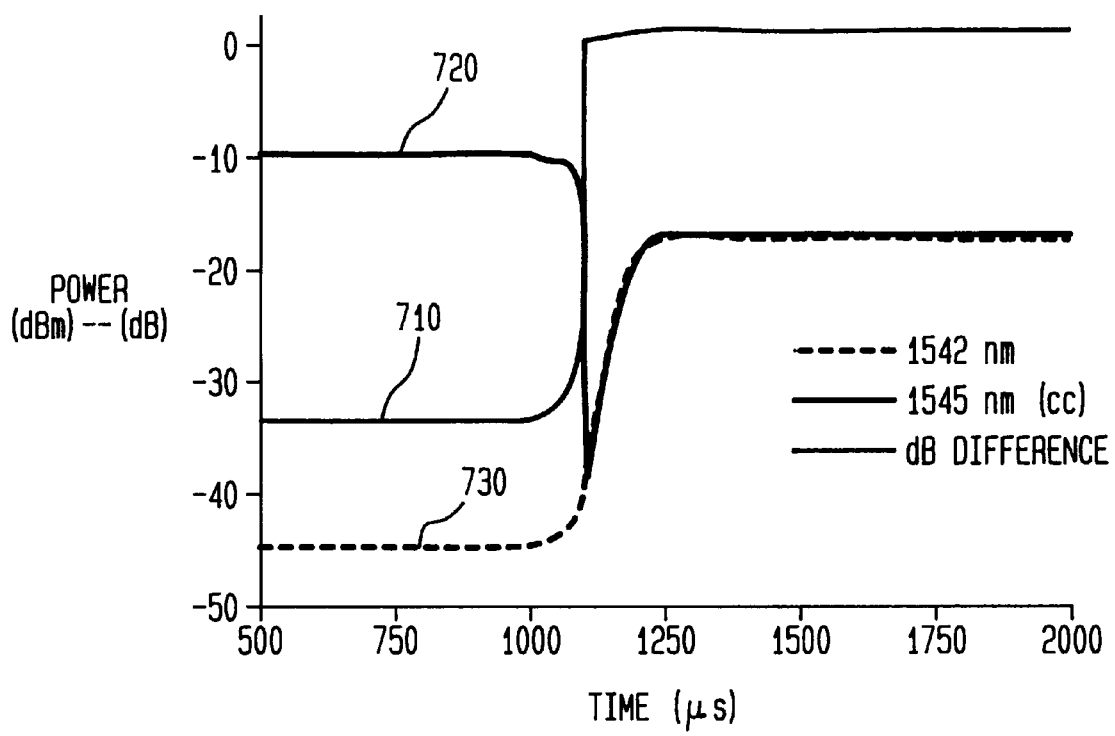

METHOD AND SYSTEM FOR DETECTING LOSS OF SIGNAL IN WAVELENGTH DIVISION MULTIPLEXED SYSTEMS

FIELD OF THE INVENTION

This invention relates to Wavelength Division Multiplexed (WDM) systems and specifically to fault detection in WDM systems.

BACKGROUND OF THE INVENTION

WDM technology has provided a cost-effective solution to fiber exhaust in communications networks by increasing the data throughput of the network without requiring the installation of new fiber. In a WDM system each of several input signals enter a WDM node or network element and is assigned or converted to a specific wavelength, typically, in the 1550 nanometer (nm) band. After wavelength conversion each individual signal wavelength or channel is then multiplexed by wavelength division multiplexing and transmitted onto the same fiber. In order for WDM technology to be truly viable as a network solution, WDM systems must also be able to survive faults that occur in any network. The issue of network survivability takes on additional import in WDM systems since the loss of a fiber could be catastrophic and costly given the enormous amount of customer data, e.g., multigigabit data, a WDM system transports on a single fiber.

In response to concerns regarding WDM network survivability, self-healing WDM ring and point-to-point diverse protection architectures have been proposed. A self-healing ring is a network architecture that connects the nodes in a physical ring topology with bandwidth sharing and self-healing capabilities to overcome failures in the network. For the purposes of this description each node in a ring is connected to another node via fiber. If a fiber cut or other fault, e.g., node failure, occurs, then the ring automatically switches to a standby fiber and, in some cases, standby electronics. Point-to-point diverse protection systems similarly protect the network from fiber cable cuts by automatically switching the customer data to a standby fiber routed along a different path. In either case automatic protection switching may be done optically, i.e., by switching the received optical signal to a standby fiber, or electrically, i.e., by switching the electrical representation of the received optical signal. Automatic protection switching in WDM networks promises considerable cost savings relative to pure Synchronous Optical NETworks (SONET) protection. However, before automatic protection switching can be employed in WDM systems some fundamental issues must be addressed.

One such fundamental issue for WDM systems is the detection of fiber cuts in optically amplified links. The detection of a fiber cut or a loss of signal has proven to be a difficult issue in WDM systems because the links between the nodes are usually amplified optically by Erbium Doped Fiber Amplifiers (EDFAs). Typically, in each WDM node the signal is amplified by an EDFA after multiplexing and before transmission onto the network fiber facility or link. Similarly, after reception, in each WDM node the signal is again amplified by another EDFA prior to demultiplexing. Depending on the distance between a transmitter and receiver, one or several additional EDFAs may also be placed at specific points along the fiber path. As the distance and number of amplifiers between the fiber cut and the optical monitor or receiver increases, amplified spontaneous emission from the EDFAs grows with each EDFA in the optical path. Specifically, when there is no optical input signal in a saturated EDFA, the amplified spontaneous emission may increase enough after several EDFAs so that a fiber cut could go undetected. In fact, because of amplified spontaneous emission, measurements of total optical power or even of optical power within a spectral band are insufficient for measuring certain fiber cuts.

Detection of total optical power can fail to detect certain fiber cuts depending on the location of the fiber cut relative to the EDFAs and the detection threshold. On some fiber links or spans there are no EDFAs beyond those in the nodes or network elements, while on others there may be more than one EDFA. FIG. 1 depicts a prior art working fiber/protection fiber pair in a WDM ring including network add-drop elements 120 having protection switches 121 and 122. Specifically, as exemplified in FIG. 1, on a link 110 there are four EDFAs 199 in both the counterclockwise and clockwise directions between two of the add-drop elements 120 (note here that although FIG. 1 shows a ring this discussion also pertains to point-to-point architectures). A fiber cut occurring on sublink 111 could easily be detected at a monitor point $150_1$ because the total optical power at the monitor point 150 drops to zero. However, for more remote fiber cuts, such as those occurring at sublinks 112, 113, 114 and 115, the amplified spontaneous emission provided by intervening EDFAs 199 provides optical power to monitor point $150_1$.

The relationship between the power detected at the monitor point $150_1$ in relation to the number of intervening EDFAs 199 is depicted in FIG. 2. FIG. 2 is a wavelength domain simulation that illustrates the problems with fiber cuts. The simulation assumes specific EDFA characteristics and spacing. Although results for other EDFA designs may differ quantitatively, the qualitative features shown in FIG. 2 will be similar. As FIG. 2 shows, without a fiber cut the total optical power level 201 at the monitor point $150_1$ was approximately 18 dBm. If a fiber cut occurred on sublink 112, i.e., with a single EDFA $199_1$ before the monitor point $150_1$, the total optical power 202 detected at point $150_1$ would drop to approximately 4 dBm after 0.5 millisecond (ms). On the other hand, where there were two or more EDFAs between point $150_1$ and the fiber cut, i.e., a fiber cut at sublink 113, 114 or 115, the total optical power returned to within 2 dB of the total optical power when the fiber was intact. In fact, when there were either three or four EDFAs between point $150_1$ and the fiber cut, the total optical power 204 or 205 never varied more than 4 dB and returned to the total optical power level 201 within less than 0.5 ms. As seen by power level 203, with two EDFAs, the power level also returned almost to the power level 201.

Measurements made on our testbed have confirmed the results depicted in FIG. 2. Based on our simulations and testbed measurements we have drawn the following conclusions with respect to simply monitoring the optical power to detect a fiber cut in a WDM system: when no EDFAs lie between the fiber cut and the monitor point, fiber cuts can be correctly identified; if one EDFA was between the fiber cut and monitor, correct identification of the fiber cut could not be accomplished without careful selection of the detection threshold used to detect a fiber cut; and when more than two EDFAs were located between the monitor point and the fiber cut, a threshold could not be established which would allow for detection of the fiber cut.

We have also investigated and found unsatisfactory monitoring the power within a narrower spectral band to detect fiber cuts at monitor point 150 in lieu of detecting the total optical power in the fiber. In this regard, we have inserted an additional marker wavelength into the fiber at the output of a network element. We found that if the power in the marker was high enough, simple detection of the marker is sufficient to indicate a fiber cut. However, high power at the marker wavelength results in lower EDFA gain for the signal wavelengths and is therefore undesirable. On the other hand, if the marker is at a power level comparable to the signal wavelengths, as shown in FIG. 3, then the marker allows detection of the change from the normal power level 301 to the lower power level 302 for a cut with only one EDFA before the monitor; but the marker alone will not give the contrast required to detect a fiber cut after more than two EDFAs, as shown by power levels 303, 304, and 305. Although we found that a contrast of 10 dB was possible if a very narrowband filter (filter width less than 0.2 nm) was used to generate the spectral band, such a filter places unrealistic demands on marker wavelength filtering. However, note that the width of the narrowband filter is dependent on the test setup.

Other methods are known in the art. One such method has been described by J. L. Zyskind, in U.S. Pat. No. 6,008,915, entitled "Method of Identifying Faults in WDM Optical Networks". In his method Zyskind, uses an additional laser to insert an additional monitoring channel in the WDM system fiber along with the signal channels. The power in the monitoring channel and the amplified spontaneous emission by the EDFAs employed along the fiber path are then monitored and compared to detect faults. That is, a power change in the same direction on the monitoring channel and the amplified spontaneous emission, e.g., both increase or decrease, is interpreted as signal channels being either dropped or added. On the other hand, a power change on the monitoring channel and the amplified spontaneous emission in the opposite direction is interpreted as an overall loss indicative of a fault.

The Zyskind, method requires additional components including a monitoring laser, couplers, and narrowband filters in order to be implemented. More importantly, as the number of channels are added or dropped the power level of the monitoring channel and the amplified spontaneous emission change thereby changing the threshold level for detecting faults. Zyskind's method also requires a fairly sophisticated detector that would be required to keep track of five different cases for upstream loss and signal channels that could occur. This method, therefore, would probably require decision making software.

In their paper entitled "A Novel In-Service Surveillance Scheme for Optically Amplified Transmission Systems" (published in IEEE Photonics Technology Letters, Vol. 9, No. 11, November 1997) Chan, Chun-Kit, et. al., described another prior art approach for detecting faults in WDM systems. Chan, et. al., utilize the nonflat amplified spontaneous emission spectra of the EDFAs as the light source for monitoring the fiber channel for fault. By the Chan, et. al., method fiber Bragg gratings are placed close to the input end of each EDFA, except the first EDFA after the transmitter, along the fiber path. Each fiber Bragg grating then filters a distinct wavelength within the unused spontaneous emission spectra. Each filtered wavelength is assigned to each amplifier immediately preceding a fiber Bragg grating. Because the fiber Bragg grating operates as notch filter, a power loss occurring upstream of the fiber Bragg grating results in a spectral pulse at that fiber Bragg grating distinct wavelength. By this method, fiber cuts can be localized to the fiber span between any two amplifiers. While this method does not require the use of additional lasers, it does require fiber Bragg gratings as additional components. This method would also require sophisticated spectral monitoring. This method also may not be able to detect fiber breaks that occur between a fiber Bragg grating and the input of its assigned amplifier, nor will partial failures of certain amplifiers be detectable.

All the above approaches either require additional components or are not able to detect all fiber cuts, regardless of the location of the fiber cut relative to an amplifier or a number of amplifiers.

SUMMARY OF THE INVENTION

Our invention provides a method and system for unambiguously detecting fiber cuts in an optical network regardless of the number of EDFAs that are located between the fiber cut and the monitor point.

In accordance with our invention, a marker wavelength is detected at the output of the network elements that form part of a WDM network. The power level in the marker is then compared to the power level in a non-signal wavelength region. If the ratio of the power level in the marker wavelength spectral band to the power level in the non-signal wavelength region is high then the fiber is intact. In contrast, if the ratio of power level in the marker wavelength spectral band to that in the non-signal wavelength region is approximately equal to unity then there is a fiber cut.

Our invention adds only a moderate amount of cost and complexity to WDM networks while providing sufficient information for unambiguous identification of fiber cuts by requiring no more than one additional laser at each network element in a WDM ring architecture. Furthermore, in accordance with our invention, an additional laser may not necessarily be needed in certain ring and point-to-point network configurations. Moreover, regardless of the WDM network configuration, our invention requires only circuitry that is capable of measuring the power difference in two nearby spectral regions in order to measure a fiber cut.

In accordance with our invention a fiber cut can be detected regardless of the number of EDFAs between the fiber cut and the monitor point thereby eliminating the generation of false alarms or false negatives; false negatives are defined as the detection of a loss of signal when there isn't a loss of signal.

BRIEF DESCRIPTION OF THE DRAWINGS

These and other advantageous features of our invention can be understood from the following detailed description together with the accompanying drawings, in which:

FIG. 7 depicts simulation results of the optical power before and after a fiber cut in a marker channel and a nearby non-signal channel and the ratio of those powers in accordance with our invention.

DETAILED DESCRIPTION

Figure 4:
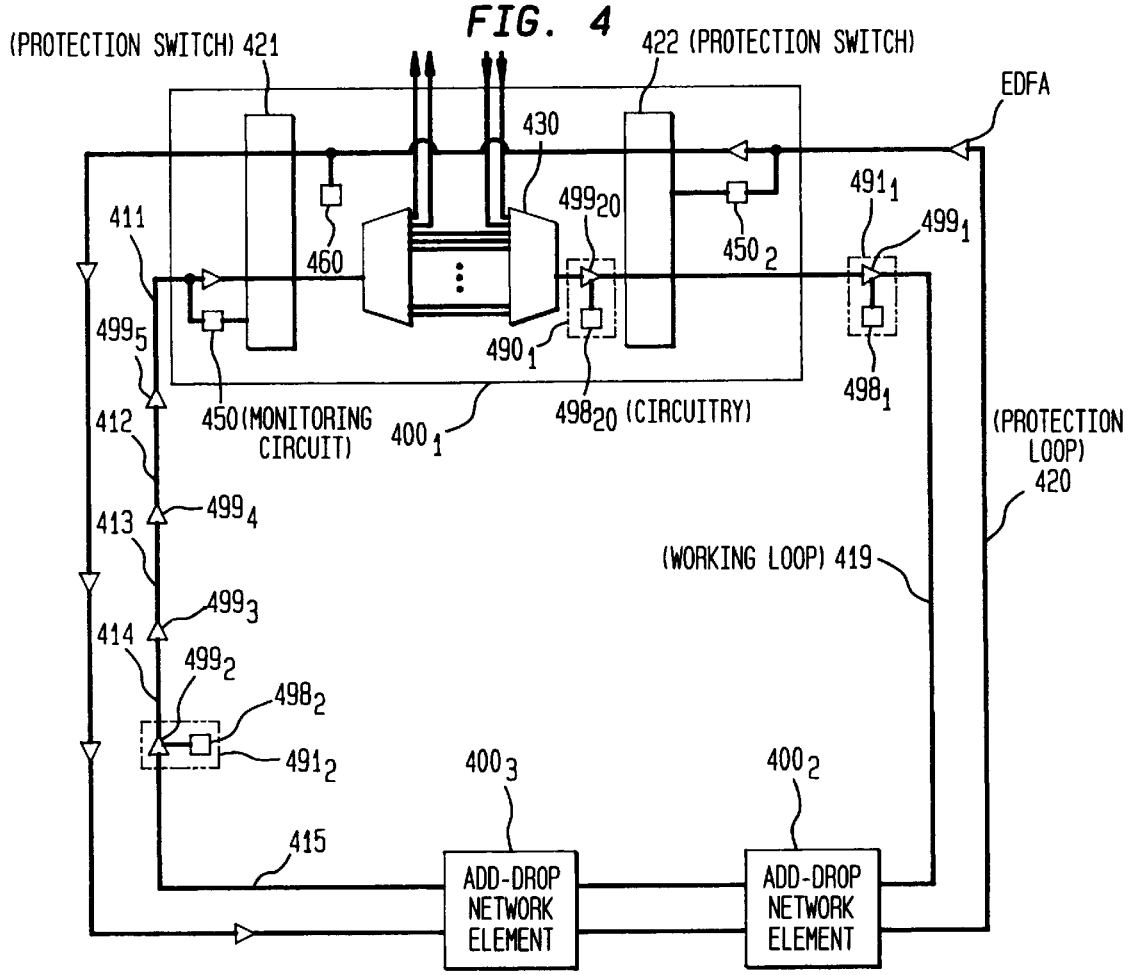
FIG. 4 illustratively depicts a WDM ring architecture employing EDFAs in accordance with our invention.

Turning now to FIG. 4, there is depicted an illustrative embodiment of a WDM ring having a monitor device or circuitry 450 for detecting a fiber cut regardless of the number of EDFAs that are located between the fiber cut and the monitor circuitry 450. The ring includes a plurality of add-drop network elements 400 having protection switches 421 and 422 connected by an inner working loop 419 and a protection loop 420, each loop including a plurality of EDFAs 499. As FIG. 4 shows when a signal enters a WDM node or network element $400_1$ at sublink 411 a portion of the signal is tapped off and fed to a monitoring device or circuitry $450_1$. The circuitry $450_1$ is able to detect the power in two nearby spectral bands, compare the power difference between the two spectral bands and raise a flag if the comparison indicates that the power in both spectral bands is approximately equal to unity. In accordance with our invention, and as seen in FIG. 4, the WDM network element $400_1$ would include two monitoring circuits $450_1$ and $450_2$. Circuitry $450_1$ illustratively monitors the working loop 419 while circuitry $450_2$ monitors the protection loop 420. That portion of the signal not fed to circuit $450_1$ is demultiplexed and either dropped or fed through the node $400_1$ to subtending node $400_2$.

In addition to the monitoring circuits $450_1$ and $450_2$, network elements 400 may also include an external laser 460 to insert a marker wavelength or signal on the outer protection loop 420; the signals on the outer loop or protection ring 420 in FIG. 4 are illustratively propagating counterclockwise. Laser 460 is necessary in those ring architectures where the protection fibers do not carry a signal until there is a failure on the working fiber, e.g., unidirectional path switched rings. In other words, laser 460 will be necessary on the protection loop 419 if during normal operation all the signals are propagating in clockwise direction only on the working fiber or inner loop 420 in FIG. 4. On the other hand, in ring architectures where both fibers carry a signal during normal operation, e.g., a bi-directional line switched ring, an additional laser would not be necessary.

Figure 5:
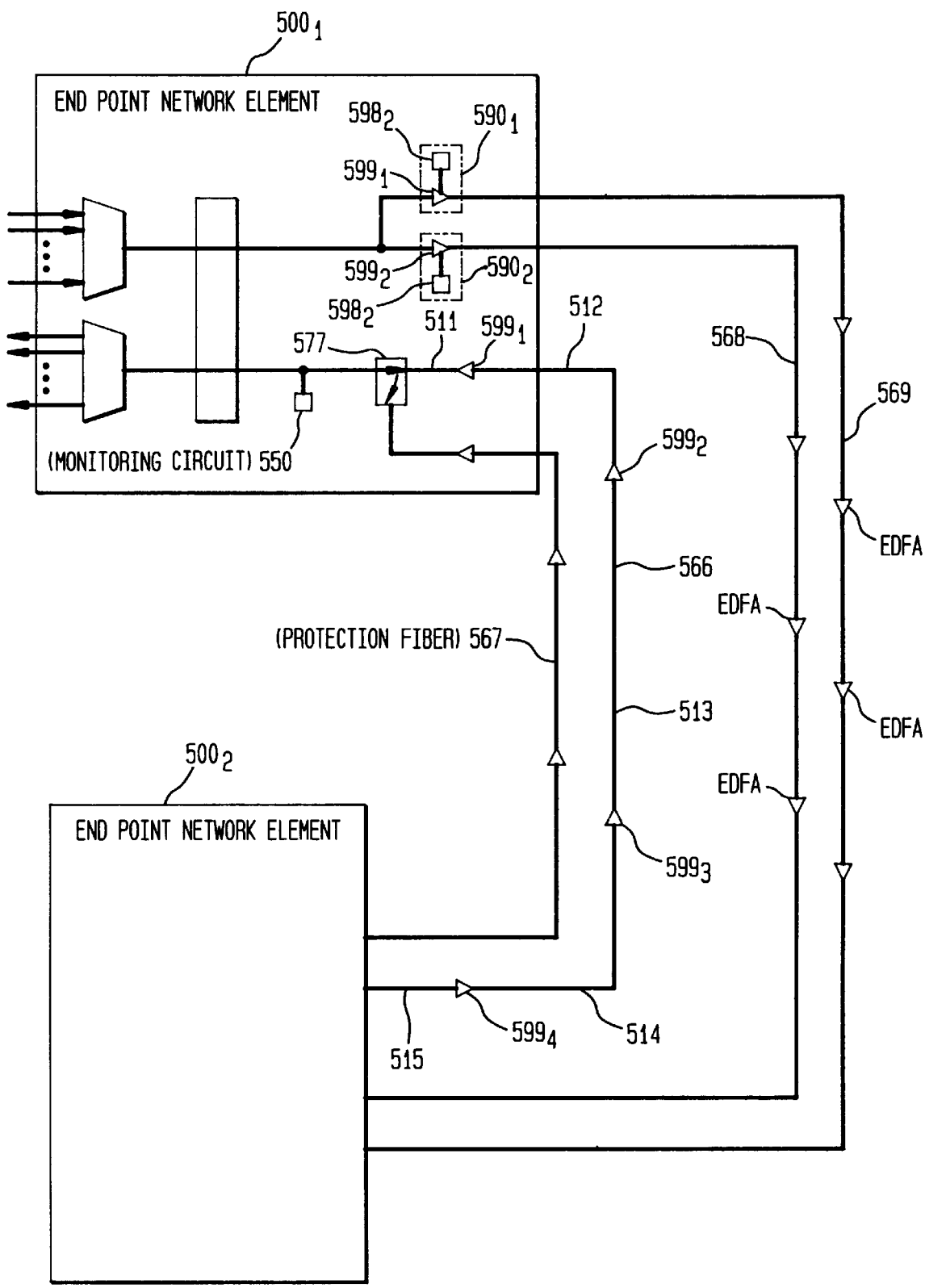
FIG. 5 illustratively depicts a point-to-point WDM architecture employing EDFAs in accordance with our invention.

Turning now to FIG. 5, there is depicted an illustrative embodiment of our invention having a diverse routing point-to-point architecture including end point network elements $500_1$ and $500_2$ interconnected by working fibers 566 and 568 and protection fibers 567 and 569, each including a plurality of EDFAs 599. A monitoring circuit 550 in each network element 500 detects a fiber cut in accordance with our invention. In this embodiment of our invention WDM network elements 500 would not require an additional laser as in the case of ring architectures. This is the case because the same signal would be transmitted on both a working fiber 566 and a protection fiber 567. As was the case in the ring architecture embodiment of FIG. 4, the monitoring circuitry 550 is able to detect the power in two nearby spectral bands, compare the power difference between the two spectral bands and raise a flag if the comparison indicates that the power in both spectral bands is approximately equal to unity. When circuitry 550 in node $500_1$ flags a fiber cut or loss of signal on the working fiber 566, the node $500_1$ switches the signal via an optical switch 577 to the protection fiber 567. If, contrary to that depicted in FIG. 5, a hot standby signal is not transmitted on the standby channel, then an additional laser may be needed on the protection line during normal operation.

Another aspect of our invention that is depicted in FIG. 4 and FIG. 5 is the use of fixed gain or gain clamped EDFAs 490 and 590 along the fiber paths. A fixed gain or clamped amplifier is an EDFA having the output power maintained at a constant level either by inserting an extra channel, known as a compensating or a stabilizing channel, in the transmitted signal. The compensating channel is used to prevent having to count the number of transmitted channels and increasing the power in the remaining channels each time a channel is dropped from the signal. With reference to FIG. 4, fixed gain EDFAs 490 having compensating channels, in addition to having an optical amplifier circuitry 499, also include circuitry 498 which is used to insert a compensating channel into the fiber. The compensating channel is primarily used to maintain a constant total power level at points in the network where a single or several channels are dropped from the fiber, i.e., at a Wavelength Division Multiplex Add Drop Multiplexer (WADM). The compensating channel is usually transmitted at a wavelength having gain almost equal to the gain of the channels. The compensating channel may be between two channels or may be a spectral region just inside the flat gain portion of the EDFA pass band. The power level in the compensating channel increases each time a channel is dropped at a WADM and vice versa, so as to maintain a constant output power.

Figure 6A:
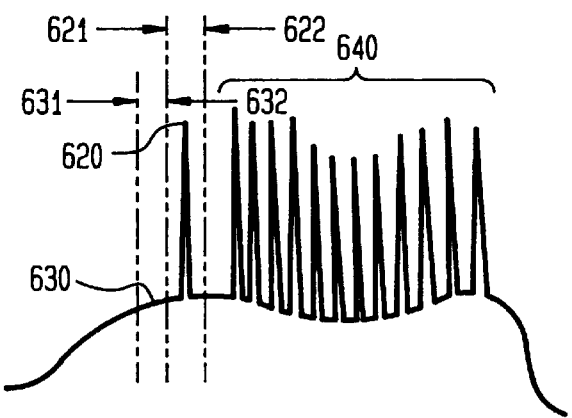
FIG. 6A depicts the power spectrum of an all optical network having a marker wavelength and a non-signal spectral region used to detect fiber cuts in accordance with our invention when the fiber is intact.
Figure 6B:
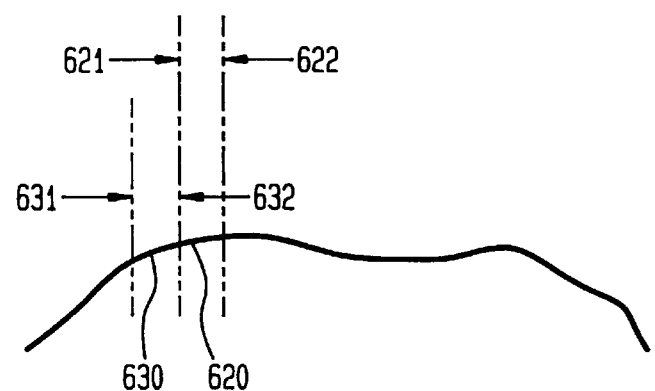
FIG. 6B depicts the power spectrum of an all optical network having a marker wavelength and the non-signal spectral region used to detect fiber cuts in accordance with our invention after a fiber cut.

Turning now to FIG. 6A, there is depicted an illustrative embodiment of a marker wavelength or compensating channel 620 and a spectral band 630 used in accordance with our invention for detecting a fiber cut or a loss of signal when the fiber is intact. Also depicted in FIG. 6A are signal wavelengths or channels 640 that are used to transport information in a WDM system. In accordance with our invention the marker wavelength 620 could be generated by any of the methods discussed below. The spectral band region 630 is chosen close enough to the marker wavelength region 620 so that an accurate comparison can be made. The spectral band is also chosen far enough away from the working signal channels 640 so that it can be separated using a filter.

Where fixed gain amplifiers are employed, we have found that a fiber cut or loss of signal may be detected without the addition of any equipment or without modulating or increasing the power of the compensating channel of a fixed gain EDFA. In accordance with our invention, if the ratio or difference in the power levels between the compensating channel and a non-signal spectral band is monitored, then fiber cuts may be reliably detected. As FIG. 6A shows, when the fiber is intact, the marker or compensating signal 620 and the working signals 640 are present in the spectrum. The spectral band 630 consists of power provided by amplified stimulated emission and is bounded within a region formed by lines 631 and 632. In accordance with this aspect of our invention, the spectral band 630 is chosen so that the amplified stimulated emission of both the marker wavelength 620 and spectral band 630 is approximately equal. As such, when the fiber is intact, as in FIG. 6A, the ratio of the power in the marker 620 and spectral band 630 is much greater than unity. On the other hand, as FIG. 6B depicts, when there is a fiber cut, or some other event causing a loss of signal, the power ratio of the marker wavelength 620 and the nearby spectral band 630 is approximately equal to unity. In using the compensating channel as the marker wavelength 620 we avoid the use of any additional equipment, eliminate potential amplifier gain changes, and eliminate the possibility of cross modulation of the signal channels, as may occur with the other approaches for generating marker wavelength 620.

The marker wavelength 620 can be easily generated for the working fiber if optical gain clamping is used for the EDFA within the network element and if the optical power used to gain clamp the EDFA is allowed to propagate to the next network element. Therefore, returning to FIG. 4, if the amplifier that is located after the multiplexer 430 in the WDM nodes 400 is a fixed gain amplifier $490_1$, then the amplifiers $491_1$ and $491_2$ that are interposed on the fiber links would not need to be fixed gain EDFAs. As such, our invention requires fixed gain EDFAs only in the WDM nodes 400 if the optical power used to gain clamp the EDFA is allowed to propagate to the next node 400 in the loop; this advantage of our invention is equally applicable to point-to-point architectures as indicated in FIG. 5. In FIG. 4, we also note that in lieu of requiring amplifier $490_1$ to be a fixed gain amplifier, it may be more convenient to insert a marker wavelength at the output of network element $400_1$. Accordingly, the network architecture would be independent of the WDM node design, i.e., it would be up to the network planner to insert the marker wavelength by appropriately placing fixed gain EDFAs.

Our analysis, on the other hand, has found that generating the marker wavelength 620 by using the compensating channel of a fixed gain amplifier is not possible on the protection fiber for a WDM ring where the protection fiber carries signals during fault conditions. While it is possible to generate a marker channel, not all failures requiring protection switching will be detected by this method, and in some cases protection switching will be initiated when it is not needed. We have found, as indicated in FIG. 4, that an additional laser 460 placed as shown between the input and output protection switches may be required at each network element for the protection fiber depending on the ring architecture.

Figure 6C:
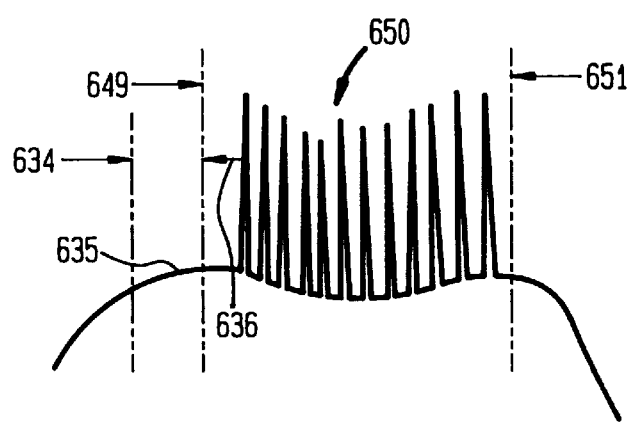
FIG. 6C depicts the power spectrum of an all optical network having a non-signal spectral region used to detect fiber cuts in accordance with another aspect of our invention when the fiber is intact.

In accordance with another aspect of our invention and as depicted in FIG. 6C, where a compensating channel is not available, i.e., where fixed gain EDFAs are not employed, the ratio of the signal wavelength region 650, denoted as the region between lines 649 and 651, and a nearby spectral band 635, denoted as the region between lines 634 and 636, may be used to detect fiber cuts. Again, as discussed above, when the fiber is intact, the ratio of the power in wavelength region 650 and band 635 is much greater than unity. On the other hand, when there is a fiber cut the FIG. 6B spectra results and the ratio of region 650 and band 635 is approximately unity, or more accurately ratios of wavelength ranges. We realize that this method of detection is limited to spans where actual signal wavelengths are in service and carrying traffic. That is, on a span without any power in the wavelength region 650, the power ratio of region 635 and band 650 would be approximately unity even where the fiber was intact. This drawback to this aspect of our invention furthers the case for propagating the compensating channel. Of course, in optical networks not having fixed gained EDFAs and thus no compensating channels, the network operator may generate a signal wavelength as a keep alive signal that can be used to monitor the link for a fiber cut until the link is active with customer service. The approach embodied in FIG. 6C may also generate false negatives. A network operator may however generate a keep alive signal to guard against the generation of false negatives.

Figure 1:
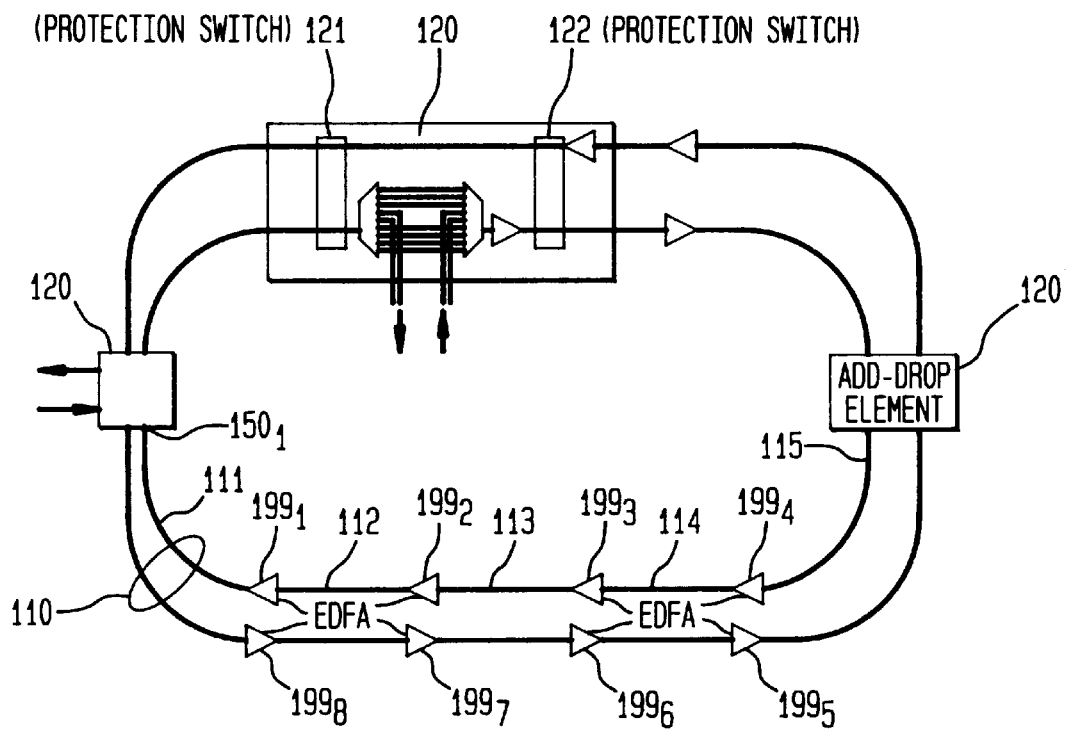
FIG. 1 illustratively depicts a prior art WDM ring employing EDFAs.
Figure 2:
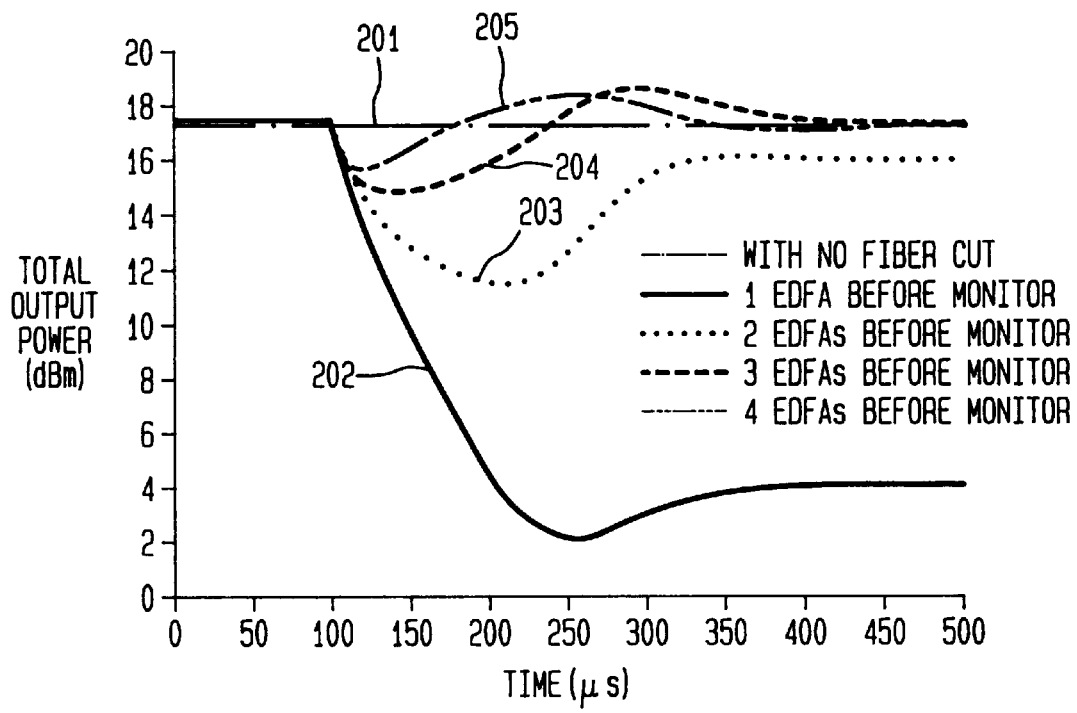
FIG. 2 depicts our measurement results of the total output power at a monitor point for fiber cuts for the WDM network depicted in FIG. 1.
Figure 3:
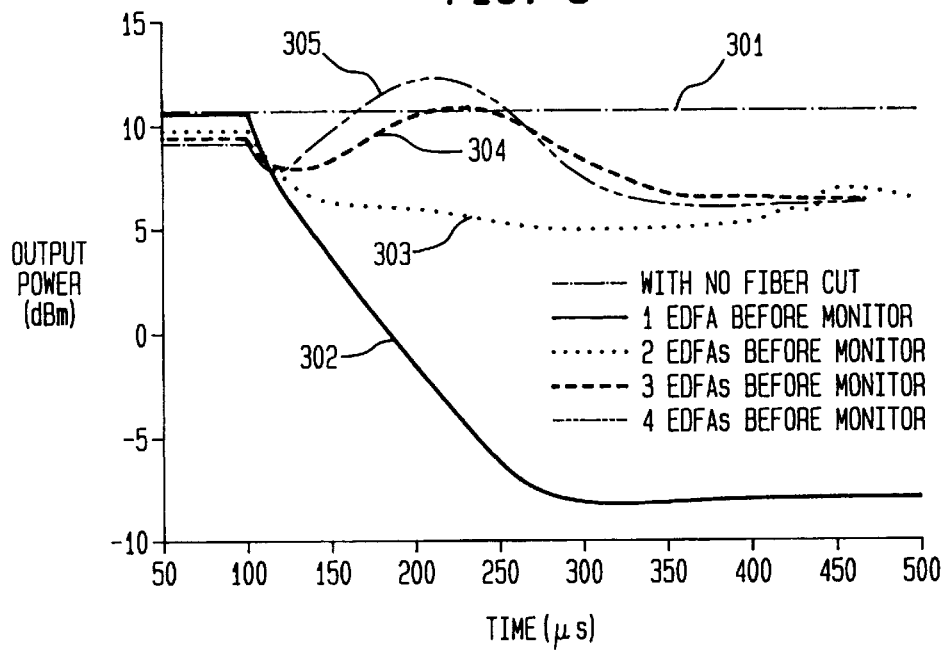
FIG. 3 depicts our simulation results of the total power in a 1 nanometer band at a marker wavelength for fiber cuts for the WDM network depicted in FIG. 1.

FIG. 7 illustrates simulations of a fiber cut at sublink 413 of FIG. 4 in accordance with our invention. As FIG. 7 illustrates, when the fiber is intact the ratio of the power level of the marker channel 720 to the nearby spectral band 730 is much greater than unity. Thus, the power difference 710, in units of decibels, between marker channel 720 and spectral band 730 is much less than zero, approximately −35 dB. On the other hand, when there is a fiber cut in sublink 413, the power ratio is close to unity and the difference 710 in power is close to zero dB. Similar results were obtained for fiber cuts at other sublinks in FIG. 4. In accordance with our invention the fiber cut is detectable within 100 µs, well within the 10 ms time period allotted for detection of catastrophic failures in the Public Switched Telecommunications Network. Also note, that the time between the fiber cut and the establishment of the new power is less than the approximately 250 µs required as shown in FIG. 3. Thus, by our method not only is the contrast greater but the switch takes place faster. The results in FIG. 7 assume that the marker 730 and the band 720 have nearly equal gain. The power ratios may be different if marker 730 and band 720 have different gains, but a large enough difference in power ratios will still be detectable for a large number of EDFAs.

During the course of our work we have noted that some consideration should be given to increasing the power in the compensating channel or marker 620 so as to achieve a better contrast or simply to use the compensating channel to detect a fiber cut. We have found that while increasing the compensating channel power may increase the contrast, it also reduces the gain in fixed gain amplifiers and the power per channel in the chain. Alternatively the EDFA may be redesigned for the operating point so that when the power in the compensating channel increases the gain remains constant. Furthermore, care must be taken to avoid gain tilt due to the fixed gain EDFA having an equivalent input that is greater than the amplifier is designed for. We have found that gain tilt can be overcome by attenuating the working signals 640 before they enter the EDFA. As far as a fixed gain EDFA is concerned, attenuation is equivalent to dropping some channels thereby increasing the power in the compensating channel.

The above description is exemplary of our invention. Numerous modifications and variations may be made by those skilled in the art without departing from the scope and spirit of our invention.

We claim:

1. In a wavelength division multiplex system having at least two nodes connected by a fiber path and the fiber path having at least one optical amplifier coupled thereto, a method for detecting at one of said nodes a fiber cut, said method comprising:

generating a marker wavelength; and detecting, at said one node, the power ratio between said generated marker wavelength and a nearby spectral band.

2. The method in accordance with claim 1 wherein said method further comprises the steps of:

determining that there is no fiber cut where said detecting step indicates a ratio much greater than unity; and determining that there is a fiber cut where said detecting step indicate a ratio approximately equal to unity.

3. The method according to claim 1 wherein said generated marker wavelength is the amplifier compensating channel.

4. A system for detecting a fiber cut on a fiber having at least one fiber amplifier between a monitor point and the fiber cut, said system comprising:

circuitry for generating a compensating channel; and circuitry for detecting the power ratio between the generated compensating channel and a spectral band having approximately the same gain as the compensating channel;

said compensating channel circuitry and said detection circuitry being coupled to the fiber so that a cut at any location along the fiber is detected.

5. The system in accordance with claim 4 wherein said detection circuitry further comprises circuitry for indicating that there is a fiber cut if the ratio detected is approximately equal to unity and for indicating for that the fiber is intact if the ratio detected is much greater than unity.

6. A wavelength division multiplex system comprising:

at least two node elements interconnected by a working and a standby fiber;

a plurality of amplifiers in said fibers; and means for determining a fiber cut in one of said fibers, said means comprising means for comparing the power ratio between a marker wavelength on said one fiber and a nearby spectral band.

7. The wavelength division multiplex system in accordance with claim 6 wherein said amplifiers are erbium doped amplifiers.

8. The wavelength division multiplex system in accordance with claim 7 wherein said node elements are arranged in a ring configuration.

9. The wavelength division multiplex system in accordance with claim 8 further comprising a laser connected to said standby optical fiber of the ring configuration for providing said marker wavelength.

10. The wavelength division multiplex system in accordance with claim 7 wherein at least one of said amplifiers includes means for inserting a compensating channel into the fiber in which said one amplifier is located.

11. A wavelength division multiplex system comprising:

at least two node elements interconnected by a working and a standby fiber;

a plurality of erbium doped amplifiers in said fibers;

means for determining a fiber cut in one of said fibers, said means comprising means for comparing the power ratio between a marker wavelength on said one fiber and a nearby spectral band; and wherein said marker wavelength is provided by the erbium doped amplifiers.

12. A wavelength division multiplex system comprising:

at least two node elements interconnected by a working and a standby fiber, said node elements being arranged in a point-to-point configuration;

a plurality of amplifiers in said fibers, means for determining a fiber cut coupled to one of said fibers, said means comprising means for comparing the power ratio between a marker wavelength on said one fiber and a nearby spectral band; and means responsive to said determining means for switching from said working to said standby fiber.

13. A method for detecting a fiber cut in a wavelength division multiplex system having at least one amplifier between two node elements, said method comprising comparing the power ratio at a monitoring point on the fiber between the power in a first spectral band and the power in an adjacent spectral band.

14. The method in accordance with claim 13 wherein said detection of a power ratio approximately equal to unity indicates a fiber cut in said fiber.

15. The method in accordance with claim 14 wherein said first spectral region comprises a marker channel.

16. The method in accordance with claim 14 further comprising the step of inserting a marker channel into said fiber.

17. The method in accordance with claim 16 wherein said marker channel is inserted by a laser.

18. The method in accordance with claim 16 wherein said at least one amplifier is a compensated erbium doped fiber amplifier and said marker channel is inserted into said fiber as the compensating channel of said one amplifier.

19. A method for detecting a fiber cut in wavelength division multiplex system having at least one amplifier between two node elements, said method comprising comparing the power ratio at a monitoring point on the fiber between the power in a first spectral band and the power in an adjacent spectral band, wherein the detection of a power ratio approximately equal to unity indicates a fiber cut in said fiber, wherein said first spectral region comprises a marker channel, and wherein said amplifier is an erbium doped fiber amplifier, said marker channel comprising a compensating channel of said amplifier and said second spectral region comprises the working signals of said fiber.

20. A method for detecting a fiber cut in a wavelength division multiplex system having at least one erbium doped amplifier between two node elements, said method comprising comparing the power ratio at a monitoring point on the fiber between the power in a first spectral band and the power in an adjacent spectral band, and wherein said first spectral region comprises amplified spontaneous emission of said amplifier and said second spectral region comprises the working channels of said fiber.

* * * * *